(12) United States Patent
Takahashi et al.

(10) Patent No.: US 12,443,357 B2
(45) Date of Patent: Oct. 14, 2025

(54) MEMORY SYSTEM AND METHOD

(71) Applicant: Sony Group Corporation, Tokyo (JP)

(72) Inventors: Yuji Takahashi, Tokyo (JP); Hirokazu Hanaki, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/293,063

(22) PCT Filed: Mar. 8, 2022

(86) PCT No.: PCT/JP2022/009933
§ 371 (c)(1),
(2) Date: Jan. 29, 2024

(87) PCT Pub. No.: WO2023/021751
PCT Pub. Date: Feb. 23, 2023

(65) Prior Publication Data
US 2024/0329869 A1 Oct. 3, 2024

(30) Foreign Application Priority Data
Aug. 20, 2021 (JP) .................................. 2021-134699

(51) Int. Cl.
*G06F 3/06* (2006.01)
*G06F 13/28* (2006.01)

(52) U.S. Cl.
CPC .......... *G06F 3/0644* (2013.01); *G06F 3/0625* (2013.01); *G06F 3/0673* (2013.01);
(Continued)

(58) Field of Classification Search
CPC .... G06F 3/0644; G06F 3/0625; G06F 3/0673; G06F 13/28; G06F 2206/1004;
(Continued)

(56) References Cited

U.S. PATENT DOCUMENTS

| | | | | |
|---|---|---|---|---|
| 2008/0034234 A1* | 2/2008 | Shimizu | ................ | G06F 1/3275 713/320 |
| 2022/0100407 A1* | 3/2022 | Secatch | ................ | G06F 1/3275 |

FOREIGN PATENT DOCUMENTS

| | | |
|---|---|---|
| JP | 2008040606 A | 2/2008 |
| JP | 2009503627 A | 1/2009 |

(Continued)

OTHER PUBLICATIONS

Translation of JP2012164046 (Year: 2012).*
International Search Report (PCT/ISA/210), International Application No. PCT/JP2022/009933, dated May 24, 2022.

*Primary Examiner* — Zhuo H Li
(74) *Attorney, Agent, or Firm* — Michael Best & Friedrich LLP (57) ABSTRACT

A memory system (100) includes a memory (2) including a plurality of pages (21) on each of which data can be arranged and a defragmenting device (4) that rearranges the data arranged on the plurality of pages (21). The memory (2) includes a plurality of tiles (22) each including one or more pages. Each of the plurality of tiles (22) is configured to be capable of transitioning among a plurality of states in which power consumption suppression rates are different. The plurality of states include a low power consumption state different from a power-off state. The defragmenting device (4) rearranges the data such that the tile (22) in which high access frequency data are collected and the tile (22) in which low access frequency data are collected are present.

18 Claims, 7 Drawing Sheets

(52) U.S. Cl.
CPC ...... *G06F 13/28* (2013.01); *G06F 2206/1004* (2013.01); *G06F 2213/28* (2013.01)

(58) Field of Classification Search
CPC ...... G06F 2213/28; G06F 12/00; G06F 12/02; G06F 12/06; Y02D 10/00
See application file for complete search history.

(56) References Cited

FOREIGN PATENT DOCUMENTS

| | | | |
|---|---|---|---|
| JP | 2010033345 A | | 2/2010 |
| JP | 2012164046 A | * | 8/2012 |
| JP | 2019036280 A | | 3/2019 |
| WO | 2010125852 A1 | | 11/2010 |

* cited by examiner

TILE #0

| PAGE ADDRESS | PHYSICAL ADDRESS | Valid/Invalid | NUMBER OF TIMES OF ACCESS | ACCESS FREQUENCY MAXIMUM VALUE | ACCESS FREQUENCY MINIMUM VALUE |
|---|---|---|---|---|---|
| 0x0000 | d0 | Valid | a0 | ACCESS FREQUENCY MAXIMUM VALUE A | ACCESS FREQUENCY MINIMUM VALUE B |
| 0x0004 | d1 | Valid | a1 | | |
| 0x0008 | d2 | Valid | a2 | | |
| 0x000A | d3 | Valid | a3 | | |
| 0x000C | d4 | Valid | a4 | | |
| 0x0010 | d5 | Invalid | a5 | | |
| 0x0014 | d6 | Invalid | a6 | | |
| 0x0018 | d7 | Invalid | a7 | | |
| 0xFFF8 | d13 | Invalid | a13 | | |
| 0xFFFA | d14 | Invalid | a14 | | |
| 0xFFFC | d15 | Invalid | a15 | | |

TILE #0

| PAGE ADDRESS | PHYSICAL ADDRESS | Valid/Invalid | PREVIOUS COUNTER VALUE | LATEST COUNTER VALUE | ACCESS FREQUENCY MAXIMUM VALUE | ACCESS FREQUENCY MINIMUM VALUE |
|---|---|---|---|---|---|---|
| 0x0000 | d0 | Valid | pc0 | lc0 | ACCESS FREQUENCY MAXIMUM VALUE A | ACCESS FREQUENCY MINIMUM VALUE B |
| 0x0004 | d1 | Valid | pc1 | lc1 | | |
| 0x0008 | d2 | Valid | pc2 | lc2 | | |
| 0x000A | d3 | Valid | pc3 | lc3 | | |
| 0x000C | d4 | Valid | pc4 | lc4 | | |
| 0x0010 | d5 | Invalid | pc5 | lc5 | | |
| 0x0014 | d6 | Invalid | pc6 | lc6 | | |
| 0x0018 | d7 | Invalid | pc7 | lc7 | | |
| 0xFFF8 | d13 | Invalid | pc13 | lc13 | | |
| 0xFFFA | d14 | Invalid | pc14 | lc14 | | |
| 0xFFFC | d15 | Invalid | pc15 | lc15 | | |

MEMORY SYSTEM AND METHOD

FIELD

The present disclosure relates to a memory system and a method.

BACKGROUND

For example, as disclosed in Patent Literature 1 to Patent Literature 3, a method of setting a low power consumption mode for each of regions in a memory is known.

CITATION LIST

Patent Literature

Patent Literature 1: WO 2010/125852 A
Patent Literature 2: JP 2010-33345 A
Patent Literature 3: JP 2009-503627 W

SUMMARY

Technical Problem

According to semiconductor process miniaturization and the like, a problem of an increase in power consumption due to a leakage current has become apparent.

One aspect of the present disclosure enables suppression of power consumption.

Solution to Problem

A memory system according to one aspect of the present disclosure includes: a memory including a plurality of pages on each of which data can be arranged; a defragmenting device that rearranges the data arranged on the plurality of pages, wherein the memory includes a plurality of tiles each including one or more pages, each of the plurality of tiles is configured to be capable of transitioning among a plurality of states in which power consumption suppression rates are different, the plurality of states include a low power consumption state different from a power-off state, and the defragmenting device rearranges the data such that a tile in which high access frequency data are collected and a tile in which low access frequency data are collected are present.

A method according to one aspect of the present disclosure is a method of rearranging data arranged on a plurality of pages of a memory including the plurality of pages on each of which data can be arranged, wherein the memory includes a plurality of tiles each including one or more pages, wherein each of the plurality of tiles is configured to be capable of transitioning among a plurality of states in which power consumption suppression rates are different, wherein the method includes rearranging the data such that a tile in which high access frequency data are collected and a tile in which low access frequency data are collected are present.

DESCRIPTION OF EMBODIMENTS

Embodiments of the present disclosure are explained in detail below with reference to the drawings. Note that, in the embodiment explained below, redundant explanation is omitted by denoting the same elements with the same reference numerals and signs.

The present disclosure is explained according to order of items described below.

1. Embodiment
2. Modifications
3. Example of effects

1. Embodiment

Figure 1:
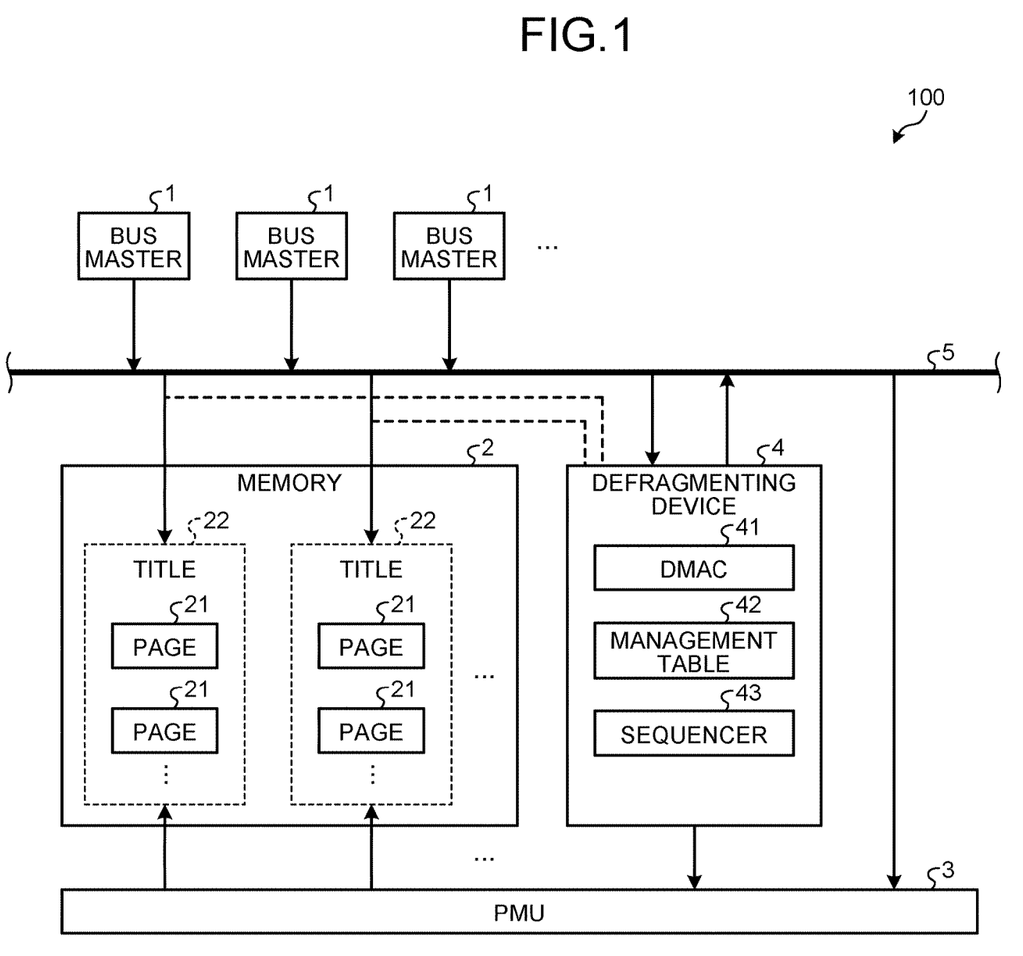
FIG. 1 is a diagram illustrating an example of a schematic configuration of a memory system according to an embodiment.

FIG. 1 is a diagram illustrating an example of a schematic configuration of a memory system according to an embodiment; A memory system 100 includes a bus master 1, a memory 2, a PMU 3, a defragmenting device 4, and a bus 5 to which these are connected. Note that the bus master 1 may not be a component of the memory system 100.

The bus master 1 performs, for example, transmission and reception of data to and from other devices via the bus 5. For example, the bus master 1 accesses the memory 2 via the bus 5, reads data in the memory 2, and writes data in the memory 2. Examples of the bus master 1 include a CPU (Central Processing Unit), a DMAC (Direct Memory Access Controller), various hardware engines, and various Interface (I/F) circuits. A plurality of bus masters 1 may be present. Three bus masters 1 are illustrated in FIG. 1.

The memory 2 stores data to be read or written by the bus master 1. The memory 2 may be either a volatile memory (VM) or a nonvolatile memory (NVM) or may include both of the volatile memory and the nonvolatile memory.

The memory 2 is divided to include a plurality of pages 21. Data is arranged on each of the plurality of pages 21. Each of the data (page data) arranged on the page 21 can be accessed and rearrangement explained below is possible.

The memory 2 is also divided to include a plurality of tiles 22. Each of the plurality of tiles 22 includes one or more pages 21. Storage capacities and memory types of the tiles 22 may be the same or may be different.

Various data having different access frequencies are arranged on the page 21. This is explained with reference to FIG. 2.

Figure 2:
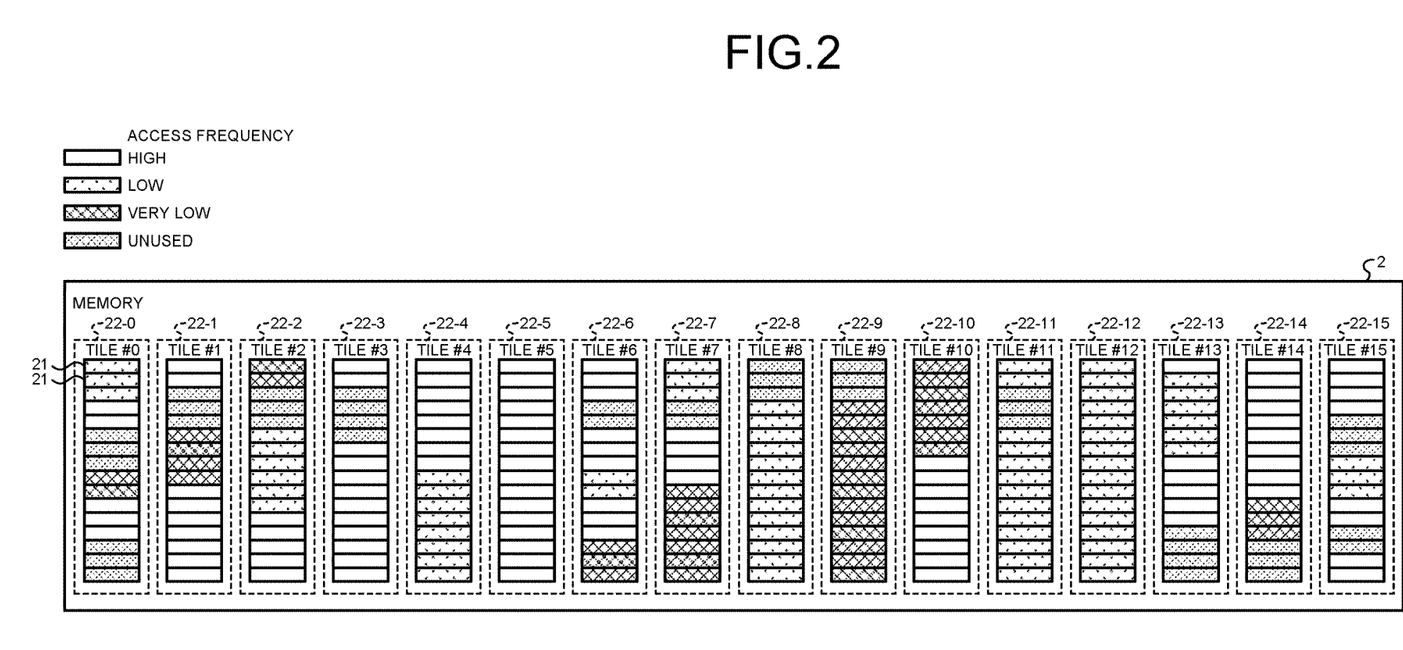
FIG. 2 is a diagram illustrating an example of data arrangement.

FIG. 2 is a diagram illustrating an example of data arrangement. In this example, the memory 2 includes sixteen tiles 22 and each of the tiles 22 includes sixteen pages 21. The tiles 22 are subjected to, for example, number management. In this example, the plurality of tiles 22 are managed with numbers 0 to 15. The tiles 22 corresponding to the numbers are referred to as tile 22-0 to tile 22-15 (tile #0 to tile #15) and illustrated. Note that the numbers of the tiles 22 may not be serial numbers.

A tile with a small number is also referred to as "left tile" and a tile with a large number is also referred to as "right tile". In the number management, tiles adjacent to each other are also referred to as "adjacent tiles".

FIG. 2 illustrates four types of pages 21 on which data having different access frequencies are arranged. The page 21 on which data having a high access frequency is arranged is illustrated in white. The page 21 on which data having a low access frequency is arranged, the page 21 on which data having a very low (lower) access frequency is arranged, and an unused page 21 on which data is not arranged are illustrated by different hatching. The data having a high access frequency is also referred to as "high access frequency data". The data with a low access frequency and the data with a very low access frequency are also referred to as "low access frequency data". As is understood, the high access frequency data and the low access frequency data are interspersed in the tiles 22.

Returning back to FIG. 1, the PMU 3 is a power management unit that manages a power supply for the memory 2 and is a hardware module that controls a power supply in the memory system 100 including the memory 2. The PMU 3 enables control of power consumption of the memory 2. For example, power consumption due to a leakage current is suppressed. Various publicly known suppression methods may be used. Since those skilled in the art can understand the methods, detailed description thereof is omitted.

Power consumption of each of the plurality of tiles 22 is individually controlled by the PMU 3. That is, each of the plurality of tiles 22 is configured to be transitionable (switchable) among a plurality of states in which power consumption suppression rates are different. Several examples of the plurality of states are explained.

The plurality of states includes a normal state N. The normal state N is a state in which data access to the tiles 22 (access to data in the tiles 22) is possible. On the other hand, power consumption of the tiles 22 is not suppressed. The power consumption suppression rate is a suppression rate of power consumption based on power consumption in the normal state N. In the normal state N, the power consumption suppression rate is 0%.

The plurality of states include one or more different low power consumption states. The low power consumption states are states in which data access to the tile 22 cannot be immediately performed. It is necessary to transition to the normal state N for data access. Therefore, it takes time for the data access. On the other hand, power consumption of the tiles 22 is more suppressed than in the normal state N. Various low power consumption states corresponding to the specifications of the memory 2 and the like can be present. In the following explanation, a case in which the low power consumption state includes a low power consumption state X, an ultralow power consumption state Y, and a power-off state Z is explained as an example.

The power consumption of the tiles 22 decreases in the order of the low power consumption state X, the ultralow power consumption state Y, and the power-off state Z. For example, power consumption suppression rates of the low power consumption state X, the ultralow power consumption state Y, and the power-off state Z are respectively 20%, 70%, and 100%. Ratios of the power consumption in the low power consumption state X, the ultralow power consumption state Y, and the power-off state Z to the power consumption in the normal state N are respectively 80%, 30%, and 0%. On the other hand, times required for the transition to the normal state N increase in the order of the low power consumption state X, the ultralow power consumption state Y, and the power-off state Z. When the tiles 22 are tiles of a volatile memory, data is lost in the power-off state Z.

It is conceivable to suppress power consumption of the entire memory system 100 by transitioning the tiles 22 having a low data access frequency to the low power consumption state. However, as illustrated in FIG. 2 referred to above, when the pages 21 on which data having a high access frequency is arranged are interspersed in the tiles 22, the number of tiles 22 that can be transitioned to the low power consumption state is limited. In order to cope with this problem, the data is rearranged (defragmented) by a defragmenting device 4 explained next such that data having an equal access frequency are arranged as collectively as possible in the same tile. More tiles 22 can be transitioned to the low power consumption state and the power consumption of the entire memory system 100 can be suppressed accordingly.

The defragmenting device 4 rearranges data arranged in the plurality of pages 21 of the memory 2. The defragmenting device 4 includes a DMAC 41, a management table 42, and a sequencer 43. The defragmenting device 4 may be implemented by hardware (Defrag Hard Ware) configured to have these functions.

The DMAC 41 is configured to be able to perform data access to the memory 2. The DMAC 41 accesses the memory 2 and transfers data arranged on the page 21 to another page 21. The transfer of the data includes interchange of data between the pages 21. Data arranged on one page 21 is transferred to the other page 21 and data on the other page 21 is transferred to one page 21. A buffer that temporarily stores the data at the time of the interchange is also included in the DMAC 41. The transfer of the data includes one-way transfer. When the page 21 at a transfer destination is not in use, data of the page 21 at a transfer source is transferred to the unused page 21. A series of processing for rearranging data is executed atomically such that data access to the memory 2 does not occur halfway.

The management table 42 is configured to manage data. The management includes management of an access frequency besides management of an address and the like of the data. The access frequency is counted (for example, calculated) based on, for example, the number of times of access or an access interval. The counting is executed by, for example, the sequencer 43 explained below and a counting result is managed by the management table 42. Two types of management tables 42 are explained as an example.

Figure 3:
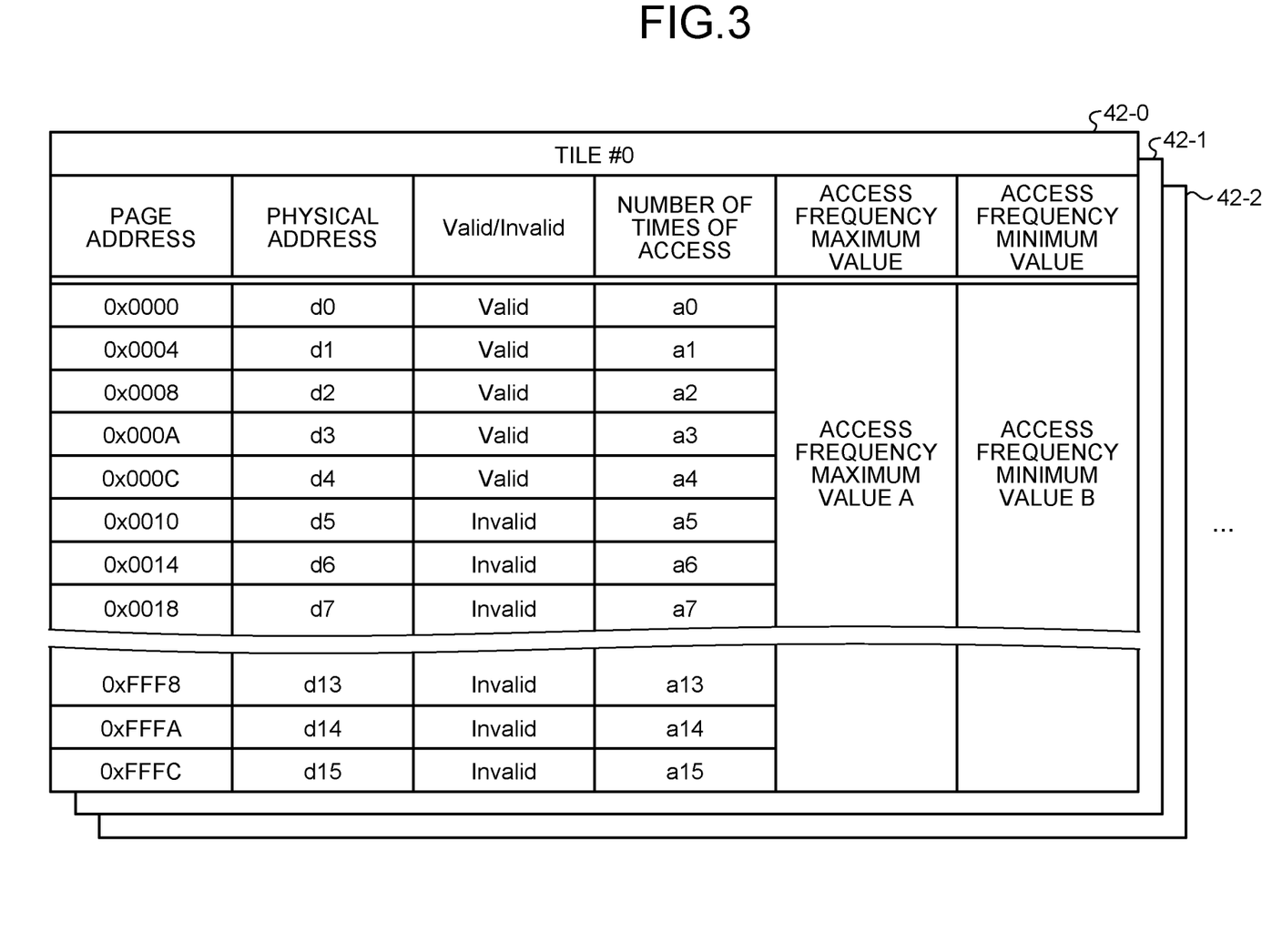
FIG. 3 is a diagram illustrating an example of a management table.
Figure 4:
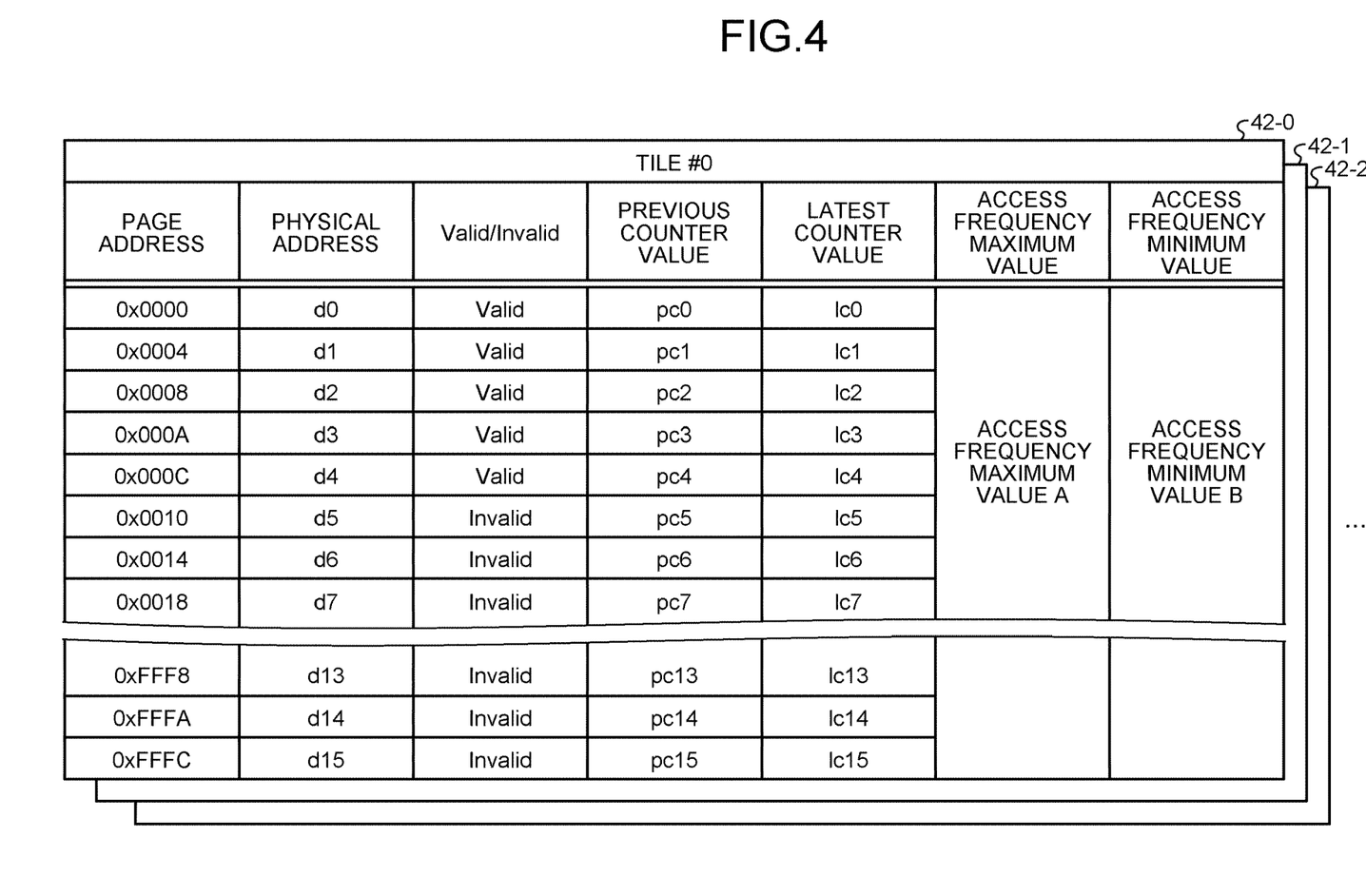
FIG. 4 is a diagram illustrating an example of the management table.

FIG. 3 and FIG. 4 are diagrams illustrating an example of a management table. In this example, the management table 42 is provided to correspond to each of the plurality of tiles 22. The management tables 42 are referred to as management table 42-0 or the like and illustrated. The management table 42-0 manages data in a tile 22-0. The same applies to the other management tables 42.

In the example illustrated in FIG. 3, the management table 42 describes "page address", "physical address", "Valid/Invalid", and "number of times of access" in association with one another.

The "page address" corresponds to a logical address of the page 21 read from the bus master 1 or a program. In the figure, the page address is schematically illustrated as "0x000" or the like. For example, when there is data access from the bus master 1, a row matching a logical address related to the access is referred out of page address in the management table 42 and is converted into a physical address corresponding to the logical address. Data access is performed to the page 21 in the memory 2 specified by the physical address obtained by the conversion. Note that the page address is not changed even if the data is rearranged.

The "physical address" and the "Valid/Invalid" are examples of page data information. The physical address is a physical address in the memory 2. In the figure, the physical address is schematically illustrated as "d0" or the like. Since the physical address is associated with the page address, an address conversion table between the page address and the physical address is provided. A correspondence relation between the page address and the physical address, that is, the address conversion table is updated according to the data rearrangement. Valid/Invalid indicates whether the data written to the page 21 specified by the physical address is valid or invalid. The invalid page 21 is the unused page 21.

The number of times of access is the number of counts of data accesses. In the figure, the number of counts is schematically illustrated as "a0" or the like. An average access interval obtained by dividing the number of times of access by a count period is counted as an access interval of the data. An access frequency is counted based on the access interval. For example, the inverse of the access interval is counted as an access frequency. The number of times of access itself may be counted as the access frequency. In every data access, the access frequency of the data is updated and the management table 42 is updated.

The management table 42 also manages an access frequency of highest access frequency data and an access frequency of lowest access frequency data (among the data) in the corresponding tile 22. The access frequency of the highest access frequency data is referred to as an access frequency maximum value A and illustrated. The access frequency of the lowest access frequency data is referred to as an access frequency minimum value B and illustrated.

When the access frequency of the data is updated, the updated access frequency is compared with the access frequency maximum value A and the access frequency minimum value B. When the updated access frequency is higher than the access frequency maximum value A, the access frequency maximum value A is updated to be the access frequency. When the updated access frequency is lower than the access frequency minimum value B, the access frequency minimum value B is updated to be the access frequency.

In the example illustrated in FIG. 4, the management table 42 describes "page address", "physical address", "Valid/Invalid", "previous counter value", and "latest counter value" in association with one another. The access frequency maximum value A and the access frequency minimum value B are also managed.

The "previous counter value" and the "latest counter value" are, for example, counter values of a not-illustrated free counter serving as a reference. In the figure, the previous counter value and the latest counter value are schematically illustrated as "pc0", "lc0", and the like. The free counter may be provided in the defragmenting device 4 or may be provided outside the defragmenting device 4. The latest counter value is a counter value acquired at the time of the latest data access. The previous counter value is a counter value acquired at the time of the previous data access.

The difference between the latest counter value and the previous counter value is counted as an access interval of the data. An access frequency is counted based on the access interval. Every time data access is performed, the access frequency of the data is updated and the management table 42 is updated.

Returning back to FIG. 1, the sequencer 43 of the defragmenting device 4 performs various kinds of control using the DMAC 41, the management table 42, and the PMU 3.

The control by the sequencer 43 includes control of the DMAC 41. The sequencer 43 rearranges the data arranged on the page 21 by controlling the DMAC 41 referring to the management table 42. Specifically, the sequencer 43 rearranges the data such that the tile 22 in which the high access frequency data are collected and the tile 22 in which the low access frequency data are collected are present. The sequencer 43 can also rearrange the data such that the tile 22 without data, i.e. the tile 22 containing only the unused page 21 is present.

For example, the sequencer 43 rearranges the data based on a comparison result of the access frequency maximum value A and the access frequency minimum value B between the tiles 22 adjacent to each other. The data may be rearranged such that the access frequency maximum value A in one tile 22 (on the left side), the access frequency minimum value B of the tile 22, the access frequency maximum value A in the other tile 22 (on the right side), and the access frequency minimum value B of the tile 22 are lowered in this order.

To rearrange the data as explained above, for example, the sequencer 43 transfers the data between the tiles 22 such that the access frequency minimum value B of the tile 22 on the left side is not smaller than the access frequency maximum value A of the tile 22 on the right side. When the access frequency minimum value B of the tile 22 on the left side is lower than the access frequency maximum value A of the tile 22 on the right side, the sequencer 43 interchanges the lowest access frequency data of the tile 22 on the left side and the highest access frequency data of the tile 22 on the right side. When the unused page 21 is present in the tile 22 at the transfer destination, the sequencer 43 transfers the data of the tile 22 at the transfer source to the unused page 21. A specific procedure is explained with reference to FIG. 5.

Figure 5:
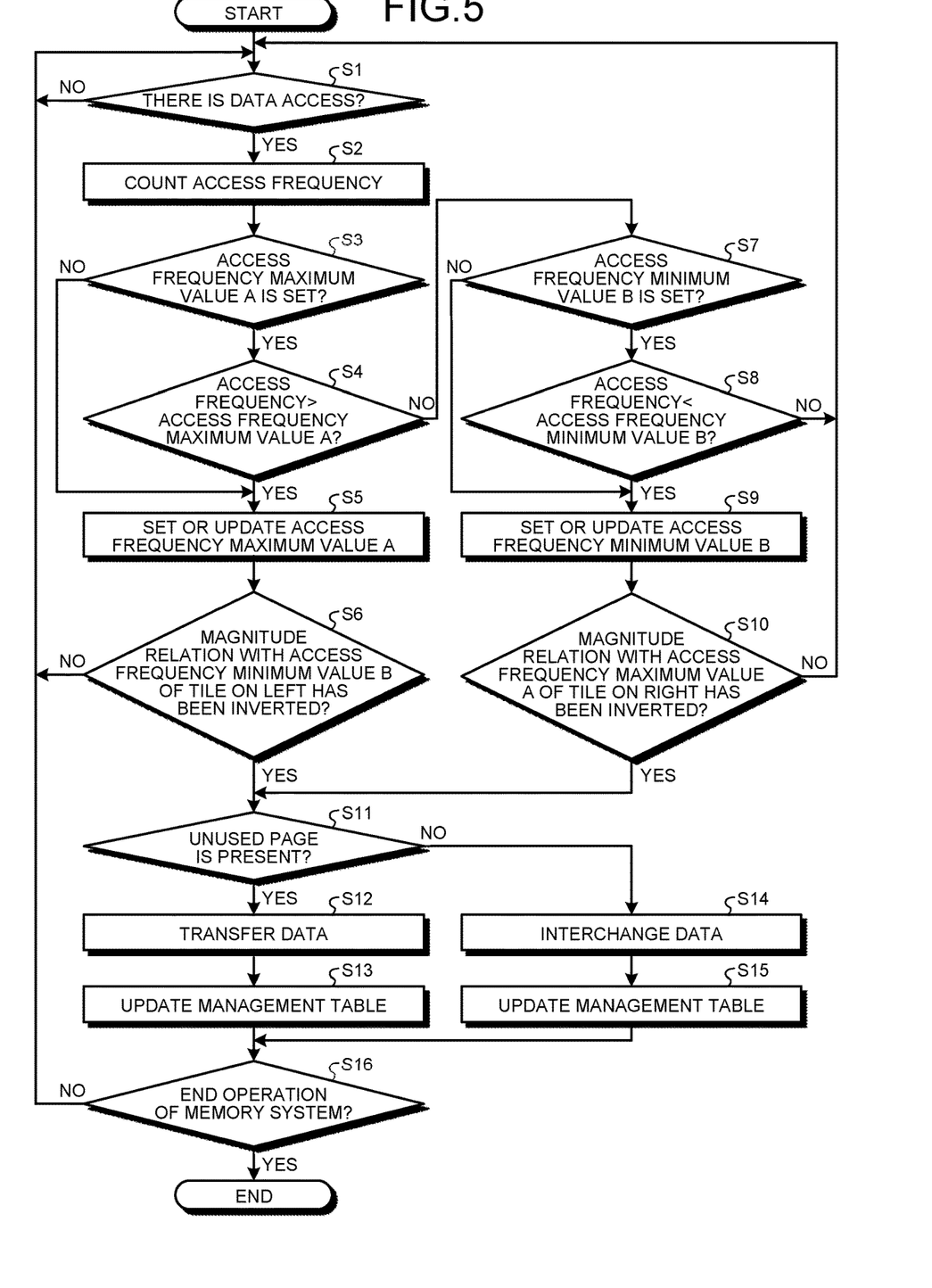
FIG. 5 is a flowchart illustrating an example of processing (data rearrangement method) executed in a defragmenting device.

FIG. 5 is a flowchart illustrating an example of processing (a data rearrangement method) executed in the defragmenting device.

In step S1, the defragmenting device 4 determines whether there is data access. The sequencer 43 determines whether there is data access to the memory 2. When there is the access (step S1), the defragmenting device 4 advances the processing to step S2. Otherwise (step S1: No), the determination in step S1 is repeated until there is data access.

In step S2, the defragmenting device 4 counts an access frequency. The sequencer 43 counts an access frequency of accessed data. As explained above with reference to FIG. 3 and FIG. 4, the count of the access frequency may be performed based on the count result of the number of times of access or may be performed based on the acquisition of the counter value.

In step S3, the defragmenting device 4 determines whether the access frequency maximum value A is set. The sequencer 43 determines whether the access frequency maximum value A of the tile 22 including the accessed data is set in the management table 42. When the access frequency maximum value A is set (step S3: Yes), the defragmenting device 4 advances the processing to step S4. Otherwise (step S3: No), the defragmenting device 4 advances the processing to step S5.

In step S4, the defragmenting device 4 determines whether the access frequency is higher (larger) than the access frequency maximum value A. The sequencer 43 determines whether the access frequency counted in the above step S2 is higher than the access frequency maximum value A set in the management table 42. When the access frequency is higher than the access frequency maximum value A (step S4: Yes), the defragmenting device 4 advances the processing to step S5. Otherwise (step S4: No), the defragmenting device 4 advances the processing to step S7.

In step S5, the defragmenting device 4 sets or updates the access frequency maximum value A. The sequencer 43 sets or updates the access frequency maximum value A such that the access frequency maximum value A of the management table 42 becomes the access frequency counted in the above step S2.

In step S6, the defragmenting device 4 determines whether a magnitude relation with the access frequency minimum value B of the tile on the left has been inverted. The sequencer 43 determines whether a magnitude relation between the access frequency maximum value A set or updated in earlier step S5 and the access frequency minimum value B of the tile 22 on the left has been inverted. When the access frequency minimum value B of the tile 22 on the left is higher, it is determined that the magnitude relation has been determined. When the magnitude relation has been inverted (step S6: Yes), the defragmenting device 4 advances the processing to step S11. Otherwise (step S6: No), the defragmenting device 4 returns the processing to step S1.

In step S7, the defragmenting device 4 determines whether the access frequency minimum value B is set. The sequencer 43 determines whether the access frequency minimum value B of the tile 22 including the accessed data is set in the management table 42. When the access frequency minimum value B is set (step S7: Yes), the defragmenting device 4 advances the processing to step S8. Otherwise (step S7: No), the defragmenting device 4 advances the processing to step S9.

In step S8, the defragmenting device 4 determines whether the access frequency is lower (smaller) than the access frequency minimum value B. The sequencer 43 determines whether the access frequency counted in the above step S2 is lower than the access frequency minimum value B set in the management table 42. When the access frequency is lower than the access frequency minimum value B (step S8: Yes), the defragmenting device 4 advances the processing to step S9. Otherwise (step S8: No), the defragmenting device 4 returns the processing to step S1.

In step S9, the defragmenting device 4 sets or updates the access frequency minimum value B. The sequencer 43 sets or updates the access frequency minimum value B such that the access frequency minimum value B of the management table 42 becomes the access frequency counted in the above step S2.

In step S10, the defragmenting device 4 determines whether the magnitude relation with the access frequency maximum value A of the tile on the right has been determined. The sequencer 43 determines whether the magnitude relation between the access frequency minimum value B set or updated in the previous step S9 and the access frequency maximum value A of the right adjacent tile 22 has been inverted. When the access frequency maximum value A of the tile 22 on the right is higher, it is determined that the magnitude relation has been determined. When the magnitude relation has been inverted (step S10: Yes), the defragmenting device 4 advances the processing to step S11. Otherwise (step S10: No), the defragmenting device 4 returns the processing to step S1.

In step S11, the defragmenting device 4 determines whether an unused page is present. The sequencer 43 refers to the management table 42 to determine whether an unused page 21 is present in the tile 22 at the data transfer destination. When an unused page is present (step S11: Yes), the defragmenting device 4 advances the processing to step S12. Otherwise (step S11: No), the defragmenting device 4 advances the processing to step S14.

In step S12, the defragmenting device 4 transfers the data. The sequencer 43 controls the DMAC 41 to transfer the data to the unused page 21 in the tile 22 at the transfer destination.

In step S13, the defragmenting device 4 updates the management table 42. The sequencer 43 updates the management table 42 such that a result of the data transfer in the above step S12 is reflected. Information concerning the data in the tiles 22 at the transfer source and the transfer destination is updated. The association (the conversion table) between the page address and the physical address is also updated. The access frequency maximum value A or the access frequency minimum value B of the management table 42 is also updated. After completion of the processing in step S13, the defragmenting device 4 advances the processing to step S16.

In step S14, the defragmenting device 4 interchanges data. The sequencer 43 controls the DMAC 41 to interchange the data in the tile 22 of the transfer source with the data in the tile 22 of the transfer destination.

In step S15, the defragmenting device 4 updates the management table 42. The sequencer 43 updates the management table 42 such that a result of the data interchange in the above step S14 is reflected. Information concerning the data in the tiles 22 at the transfer source and the transfer destination is updated. The access frequency maximum value A or the access frequency minimum value B of the management table 42 is also updated. After completion of the processing in step S15, the defragmenting device 4 advances the processing to step S16.

In step S16, the defragmenting device 4 determines whether to end the operation of the memory system 100. When the operation of the memory system 100 is ended (step S16: Yes), the processing of the flowchart ends. Otherwise (step S16: No), the defragmenting device 4 returns the processing to step S1.

For example, the processing explained above is repeatedly executed, whereby the data is rearranged.

Figure 6:
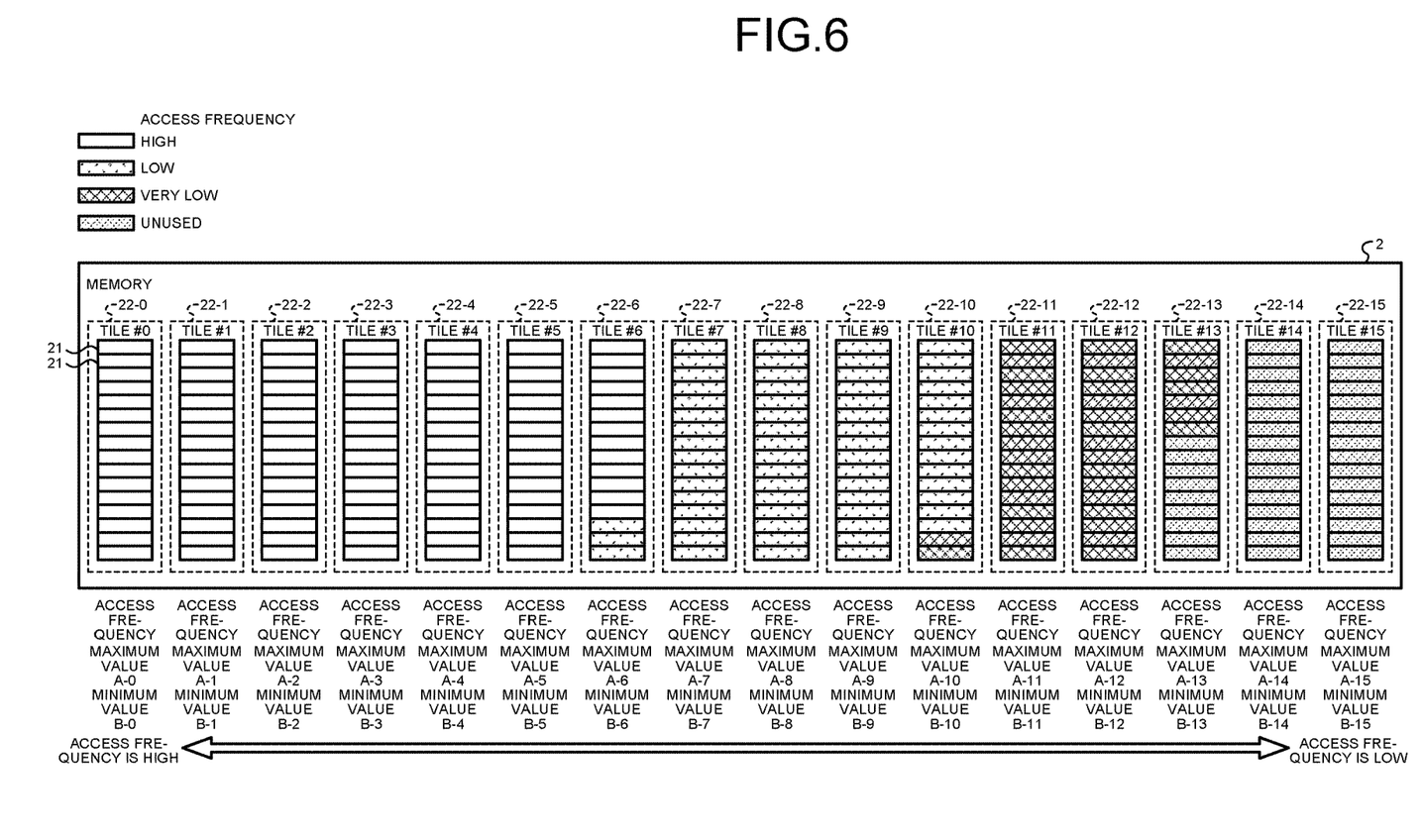
FIG. 6 is a diagram illustrating an example of data arrangement after rearrangement.

FIG. 6 is a diagram illustrating an example of data arrangement after rearrangement. In this example, high access frequency data (the pages 21 on which the high access frequency data is arranged) are collected in the tiles 22 on the left side. The unused pages 21 are collected in tiles 22 on the right side. Low-access frequency data (the pages 21 on which the low access frequency data is arranged) are collected in the tiles 22 between the tiles 22 on the left side and the tiles 22 on the right side.

The access frequency maximum value A and the access frequency minimum value B of the tile 22-0 are referred to as an access frequency maximum value A-0 and an access frequency minimum value B-0 and illustrated. The same applies to the access frequency maximum value A and the access frequency minimum value B of each of the tiles 22-1 to 22-15. Note that the access frequency maximum value A and the access frequency minimum value B of the tile 22 without data may not be present or may be treated as the lowest value (for example, 0). About the tile 22 having data, for example, the data is arranged such that the access frequency maximum value A-0 and the access frequency minimum value B-0 of the tile 22-0 and the access frequency maximum value A-1 and the access frequency minimum value B-1 of the tile 22-1 are smaller in this order. The same applies to the other tiles 22.

In the example illustrated in FIG. 6, six tiles 22 including a tile 22-0 to a tile 22-6 include the page 21 on which data having a high access frequency is arranged. The high access frequency data are collected in these six tiles 22.

The four tiles 22 of the tiles 22-7 to 22-10 do not include the page 21 on which data having a high access frequency is arranged and, on the other hand, include the page 21 on which data with a low access frequency is arranged. Three tiles 22 of the tile 22-11 to the tile 22-13 do not include the page 21 on which data having a low access frequency is arranged, and, on the other hand, include the page 21 on which data having a very low access frequency is arranged. In these 7 tiles 22, data with low access frequencies are collected.

Two tiles 22 of the tile 22-14 and the tile 22-15 include unused pages 21, while not including pages 21 with very infrequently accessed data.

For example, it is conceivable to set a state of the seven tiles 22 of the tile 22-0 to the tile 22-6 to the normal state N (a power consumption suppression rate 0%). It is conceivable to set a state of four tiles 22 of the tile 22-7 to the tile 22-10 to the low power consumption state X (a power consumption reduction of 20%). It is conceivable to set a state of three tiles 22 of the tile 22-11 to 22-13 to the ultralow power consumption state Y (a power consumption suppression rate of 70%). It is conceivable to set a state of two tiles 22 of the tile 22-14 and the tile 22-15 to the power-off state Z (a power consumption suppression rate of 100%). The power consumption in this case can be suppressed to 69% of the case in which the states of all the tiles 22 are set to the normal state N as represented by the following Expression (1) (a power consumption suppression rate of 31%).

$$\frac{7}{16} \times 100\% + \frac{4}{16} \times 80\% + \frac{3}{16} \times 30\% + \frac{2}{16} \times 0\% = 69\% \quad (1)$$

For example, when the bus master 1 is a processor (CPU or the like) on which a cache memory is mounted, an access frequency to the memory 2 is reduced and the number of tiles 22 in which low access frequency data are collected increases accordingly. The effect of suppressing power consumption is further enhanced. As an example, a case in which one processor and four tiles 22 are present is explained. When it is assumed that an access frequency in the case in which there is no cache memory is 100%, a rate of access from the processor to the tiles 22 of the memory 2 is ¼, that is, 25%. If a probability that data access to the memory 2 occurs because of a cache mistake is 5%, the access frequency to the tiles 22 is reduced to 25%× 5%=1.25%.

It is also possible to rearrange data according to a procedure different from the above. For example, data rearrangement target (defragmentation target) tiles 22 are set. All the tiles 22 may be set as rearrangement targets. The sequencer 43 of the defragmenting device 4 ranks all data in the rearrangement target tiles 22 according to access frequencies and rearranges the data based on a ranking result. The ranking is, for example, ranking in descending order of the access frequencies.

For example, the sequencer 43 counts the differences between the access frequency maximum value A and the access frequency minimum value B of the rearrangement target tiles 22 as difference values ΔAB with reference to the management table 42. The difference values ΔAB are counted by, for example, the sequencer 43 and managed by the management table 42.

The sequencer 43 ranks the data and rearranges the data when the difference value ΔAB of at least one tile 22 among the rearrangement target tiles 22 is larger than a threshold. For example, the ranking is performed when the difference value ΔAB satisfies one of the following conditions 1 and 2. Which of the condition 1 and the condition 2 is used may be set in advance. During the ranking, the counting of the data accesses to the memory 2 is stopped. The threshold may be individually set for each of the tiles 22.

Condition 1: The difference value ΔAB of one tiles 22 among the rearrangement target tiles 22 is larger than a threshold.

Condition 2: The difference values ΔAB of all the rearrangement target tiles 22 are larger than a threshold.

The sequencer 43 arranges the data in the page 21 in the tile 22 on the left side in descending order of from the data having the highest access frequency. The data arrangement explained above with reference to FIG. 5 can also be obtained by such data rearrangement.

Returning back to FIG. 1, the control by the sequencer 43 includes control of the PMU 3. The sequencer 43 controls the PMU 3 to transition (switch) a state of each of the plurality of tiles 22 among a plurality of states in which suppression rates of power consumption are different.

As explained above with reference to FIG. 6, the tiles 22 that do not include data, i.e., the tiles 22 that include only the unused page 21 on which no data is located can be present. For example, the data is rearranged such that the tile 22-14 and the tile 22-15 are present. In this case, the sequencer 43 transitions the state of the tile 22-14 and the tile 22-15 to the power-off state Z. The power consumption suppression rate of these tiles 22 is maximized.

For the tiles 22 including data, the sequencer 43 transitions a state of each of the plurality of tiles 22 such that the tile 22 having a lower data access frequency transitions to a state in which a power consumption suppression rate is larger. Power consumption (leakage power or the like) of the entire memory system 100 can be reduced by automatically transitioning a state of the tile 22 in which data having low access frequencies are collected to a low power consumption state with the defragmenting device 4 (hardware). An example of the state transition is explained with reference to FIG. 7 and FIG. 8.

Figure 7:
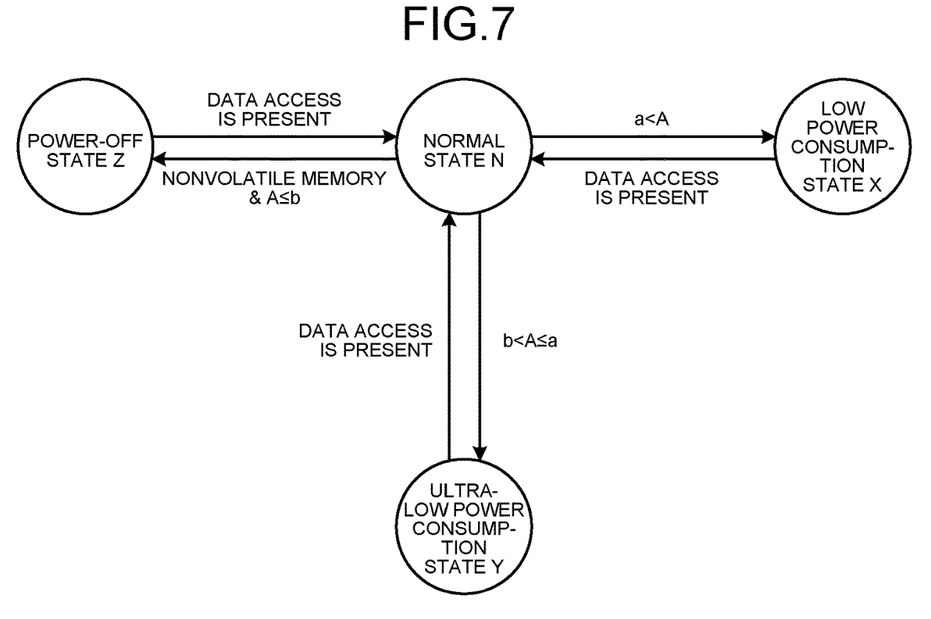
FIG. 7 is a diagram illustrating an example of state transition (a transition method) for tiles.
Figure 8:
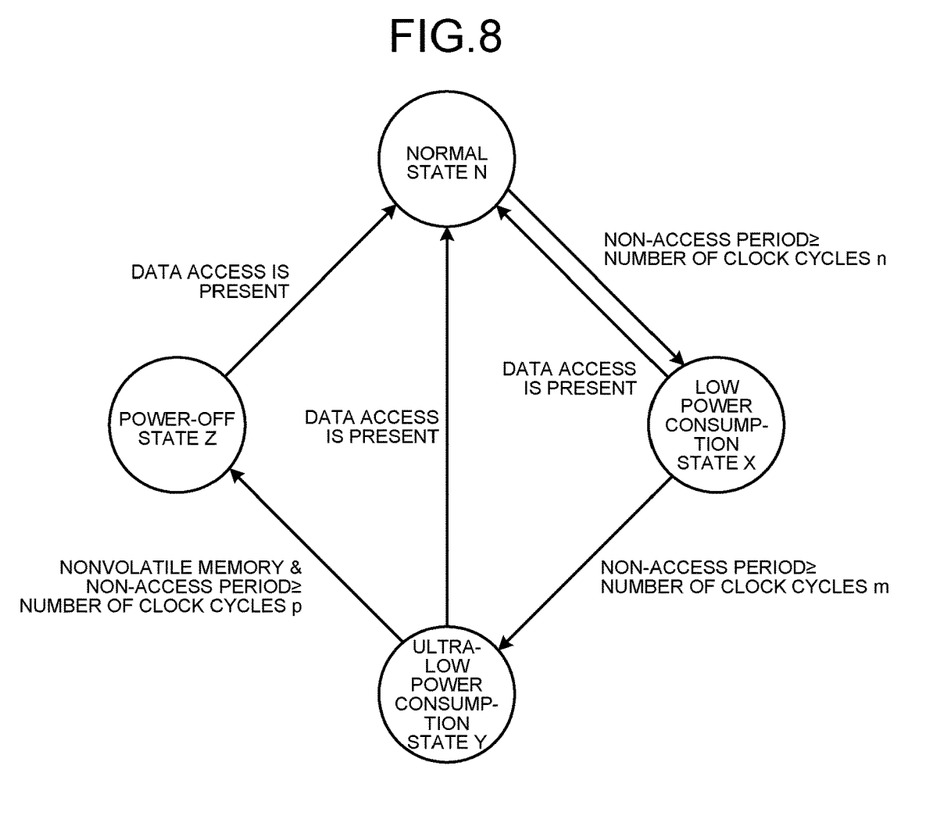
FIG. 8 is a diagram illustrating an example of state transition (a transition method) for the tiles.

FIG. 7 and FIG. 8 are diagrams illustrating examples of tile state transition (a transition method). The tile state transition is performed independently of the data rearrangement explained above with reference to FIG. 5. In transitions, the sequencer 43 issues a state transition request to the PMU 3. When the state transition is completed, the PMU 3 returns notification to that effect to the sequencer 43.

In the example illustrated in FIG. 7, the sequencer 43 transitions a state of the tile 22 based on the access frequency maximum value A of the tile 22. A state of the tile 22 at the time of data access is the normal state N. An access frequency of accessed data is counted and updated. The access frequency maximum value A or the access frequency minimum value B of the tile 22 including the data can be updated.

After completion of the data access, a state of the tile 22 immediately transitions from the normal state N to another state. Threshold determination for the access frequency maximum value A of the tile 22 to which data access has been made is performed. As the threshold, a threshold a and a threshold b are illustrated. The threshold b is smaller than the threshold a. The threshold a and the threshold b can be rewritten by, for example, software.

When the access frequency maximum value A of the tile 22 is larger than the threshold a, the sequencer 43 transitions a state of the tile 22 from the normal state N to the low power consumption state X. Power consumption of the tile 22 is suppressed more than in the normal state N. In response to the data access, the sequencer 43 transitions the state of the tile 22 from the low power consumption state X to the normal state N.

The sequencer 43 transitions the state of the tile 22 from the normal state N to the ultralow power consumption state Y when the access frequency maximum value A of the tile 22 is equal to or smaller than the threshold a and larger than the threshold b. The power consumption is further suppressed than in the low power consumption state X. In response to the data access, the sequencer 43 transitions the state of the tile 22 from the ultralow power consumption state Y to the normal state N.

When the tile 22 is a tile of the nonvolatile memory and the access frequency maximum value A of the tile 22 is equal to or smaller than the threshold b, the sequencer 43 changes a state of the tile 22 from the normal state N to the power-off state Z. The power consumption is further suppressed than in the ultralow power consumption state Y. When the state of the tile 22 does not transition to the power-off state Z, the state of tile 22 remains in ultralow power consumption state Y until there is a data access. In response to the data access, the sequencer 43 transitions the state of the tile 22 from the power-off state Z to the normal state N. Note that even if the tile 22 is a tile of the volatile memory, when the tile 22 includes only the unused page 21, the state of the tile 22 may transition to the power-off state Z.

In the example illustrated in FIG. 8, the sequencer 43 transitions a state of each of the plurality of tiles 22 such that the tile 22 having a longer period (non-access period) in which there is no data access to the tile 22 transitions to a state in which the power consumption suppression rate is larger. In this example, the non-access period is specified by the number of clock cycles.

The threshold determination for the non-access period is performed. Examples of the threshold include the number of clock cycles n, the number of clock cycles m, and the number of clock cycles p. The number of clock cycles m is larger than the number of clock cycles n. The number of clock cycles p is larger than the number of clock cycles m. The number of clock cycles n, the number of clock cycles m, and the number of clock cycles p can be rewritten by, for example, software.

When the non-access period of the tile 22 becomes the number of clock cycles n or more, the sequencer 43 changes the state of the tile 22 from the normal state N to the low power consumption state X. Power consumption of the tile 22 is suppressed more than in the normal state N. In response to the data access, the sequencer 43 transitions the state of the tile 22 from the low power consumption state X to the normal state N.

When the non-access period of the tile 22 becomes the number of clock cycles m or more, the sequencer 43 transitions the state of the tile 22 from the low power consumption state X to the ultralow power consumption state Y. The power consumption of the tile 22 is further suppressed than in the low power consumption state X. In response to the data access, the sequencer 43 transitions the state of the tile 22 from the ultralow power consumption state Y to the normal state N.

The sequencer 43 transitions the state of the tile 22 from the ultralow power consumption state Y to the power-off state Z when the tile 22 is a tile of the nonvolatile memory and the non-access period of the tile 22 becomes the number of clock cycles p or more. The power consumption is further suppressed than in the ultralow power consumption state Y. When the state of the tile 22 does not transition to the power-off state Z, the state of tile 22 remains in ultralow power consumption state Y until there is a data access. In response to the data access, the sequencer 43 transitions the state of the tile 22 from the power-off state Z to the normal state N. Note that even if the tile 22 is a tile of the volatile memory, when the tile 22 includes only the unused page 21, the state of the tile 22 may transition to the power-off state Z.

For example, as explained above, the state of the tile 22 having a low data access frequency, that is, the state of the tile 22 in which low access frequency data are collected can be transitioned to the low power consumption state.

2. Modifications

The disclosed technique is not limited to the embodiment explained above. Several modifications are explained.

In the embodiment explained above, an example is explained in which all the functions of the defragmenting device 4 are implemented by hardware. However, some functions of the defragmenting device 4 may be implemented by software. For example, functions of data rearrangement, data transfer (including exchange), and update of association between a page address and a physical address (update of an address conversion table) may be implemented by software. However, the implementation by the hardware has advantages such as increase in processing speed. When the data transfer is executed by the software, for example, a processing period of at least 4 clock cycles is required per one word data. However, when the data transfer is executed by the hardware (the DMAC 41), processing speed can be increased to 1 clock cycle per one word data. Further, since the transfer can be performed in the background of the software, it is also possible to reduce overhead viewed from the software to zero.

In the embodiment explained above, an example is explained in which the memory 2 includes the sixteen tiles 22 and each of the tiles 22 includes the sixteen pages 21. However, the number of tiles 22 included in the memory 2 may be any number equal to or larger than two. The number of pages 21 included in tile 22 may be any number equal to or larger than one.

3. Example of Effects

The technique explained above is specified, for example, as explained below. As explained with reference to FIG. 1 to FIG. 8, the memory system 100 includes the memory 2 and the defragmenting device 4. The memory 2 includes the plurality of pages 21 on each of which data can be arranged. The defragmenting device 4 rearranges the data arranged on the plurality of pages 21. The memory 2 includes the plurality of tiles 22 each including one or more pages 21. Each of the plurality of tiles 22 is configured to be able to transition between the plurality of states (for example, the normal state N, the low power consumption state X, the ultralow power consumption state Y, and the power-off state Z) having different power consumption suppression rates. The plurality of states includes the low power consumption state different from the power-off state. The defragmenting device 4 rearranges the data such that the tile 22 in which high access frequency data are collected and the tile 22 in which low access frequency data are collected are present.

With the memory system 100 explained above, the data is rearranged such that the tile 22 in which the high access frequency data are collected and the tile 22 in which the low access frequency data are collected are present. For example, power consumption can be suppressed by setting the state of the tile 22 in which the low access frequency data are collected to the low power consumption state.

As explained with reference to FIG. 7, FIG. 8, and the like, the defragmenting device 4 may transition the state of each of the plurality of tiles 22 such that the tile 22 having a lower data access frequency (for example, the access frequency maximum value A) transitions to a state in which a power consumption suppression rate is larger. The defragmenting device 4 may transition the state of each of the plurality of tiles 22 such that the tile 22 having a longer period without data access transitions to a state in which a power consumption suppression rate is larger. For example, as explained above, the state of the tile 22 in which the low access frequency data are collected can be transitioned to the low power consumption state.

As explained with reference to FIG. 1, FIG. 6 to FIG. 8, and the like, the plurality of states may include the power-off state Z and the defragmenting device 4 may transition the state of the tile 22 of the nonvolatile memory to the power-off state Z. When the data is rearranged such that the tile 22 including only the unused page 21 in which the data is not arranged is present, the defragmenting device 4 may transition the state of the tile 22 to the power-off state Z. Consequently, power consumption can be further suppressed.

As explained with reference to FIG. 1, FIG. 5, FIG. 6, and the like, when an access frequency of highest access frequency data in the tile 22 is set as the access frequency maximum value A of the tile and an access frequency of lowest access frequency data is set as the access frequency minimum value B of the tile, the defragmenting device 4 may rearrange data such that the access frequency maximum value A of one tile of the tiles 22 adjacent to each other in number management, the access frequency minimum value B of the one tile 22, the access frequency maximum value A of the other tile 22, and the access frequency minimum value B of the other tile 22 are lower in this order. The defragmenting device 4 may rearrange the data based on a comparison result of the access frequency maximum value A of one tile 22 of the tiles 22 adjacent to each other in the number management and the access frequency minimum value B of the other tile 22. The defragmenting device 4 may transfer data between one tile 22 and the other tile 22 such that the access frequency minimum value B of one tile 22 does not fall below the access frequency maximum value A of the other tile 22. The defragmenting device 4 may rearrange the data based on a ranking result of the access frequencies of the data. In that case, the defragmenting device 4 may rearrange the data when the difference value ΔAB between the access frequency maximum value A and the access frequency minimum value B of the at least one tile 22 is larger than a threshold. For example, the data can be rearranged in this way.

The method explained with reference to FIG. 5, FIG. 7, FIG. 8, and the like is also one of the disclosed techniques. The method is a method of rearranging data arranged on the plurality of pages 21 of the memory 2 including the plurality of pages 21 on each of which the data can be arranged. The memory 2 includes the plurality of tiles 22 each including one or more pages 21. Each of the plurality of tiles 22 is configured to be capable of transitioning among the plurality of states in which the power consumption suppression rates are different. The method includes rearranging the data (for example, steps S12 and S14) such that the tile 22 in which high access frequency data are collected and the tile 22 in which low access frequency data are collected are present. With such a method as well, power consumption can be suppressed as explained above.

Note that the effects described in the present disclosure are only examples and are not limited by the disclosed content. There may be other effects.

Although the embodiments of the present disclosure are explained above, the technical scope of the present disclosure is not limited to the embodiments explained above per se. Various changes are possible without departing from the gist of the present disclosure. Components in different embodiments and modifications may be combined as appropriate.

Note that the present technique can also take the following configurations.

(1) A memory system comprising:
 a memory including a plurality of pages on each of which data can be arranged;
 a defragmenting device that rearranges the data arranged on the plurality of pages, wherein
 the memory includes a plurality of tiles each including one or more pages,
 each of the plurality of tiles is configured to be capable of transitioning among a plurality of states in which power consumption suppression rates are different,
 the plurality of states include a low power consumption state different from a power-off state, and
 the defragmenting device rearranges the data such that a tile in which high access frequency data are collected and a tile in which low access frequency data are collected are present.

(2) The memory system according to (1), wherein
 the defragmenting device transitions a state of each of the plurality of tiles such that a tile having a lower data access frequency transitions to a state in which the power consumption suppression rate is larger.

(3) The memory system according to (1) or (2), wherein
 the defragmenting device transitions a state of each of the plurality of tiles such that a tile having a longer period without data access transitions to a state in which the power consumption suppression rate is larger.

(4) The memory system according to (2) or (3), wherein
 the plurality of states includes the power-off state, and
 the defragmenting device transitions a state of a tile of a nonvolatile memory to the power-off state.

(5) The memory system according to any one of (1) to (4), wherein
 the plurality of states includes the power-off state, and
 when the data is rearranged such that there is a tile including only an unused page on which data is not arranged, the defragmenting device transitions a state of the tile to the power-off state.

(6) The memory system according to any one of (1) to (4), wherein
 when an access frequency of highest access frequency data in the tile is set as an access frequency maximum value of the tile and an access frequency of lowest access frequency data is set as an access frequency minimum value of the tile,
the defragmenting device rearranges the data such that the access frequency maximum value of one tile of tiles adjacent to each other in number management, the access frequency minimum value of the one tile, the access frequency maximum value of another tile, and the access frequency minimum value of the other tile are lowered in this order.

(7) The memory system according to any one of (1) to (6), wherein
the defragmenting device rearranges the data based on a comparison result of an access frequency maximum value of one tile of tiles adjacent to each other in number management and an access frequency minimum value of another tile.

(8) The memory system according to (7), wherein
the defragmenting device transfers the data between the one tile and the other tile such that the access frequency minimum value of the one tile does not fall below the access frequency maximum value of the other tile.

(9) The memory system according to any one of (1) to (8), wherein
the defragmenting device rearranges the data based on a ranking result of access frequencies of the data.

(10) The memory system according to (9), wherein
the defragmenting device rearranges the data when a difference value between the access frequency maximum value and the access frequency minimum value of at least one tile is larger than a threshold.

(11) A method of rearranging data arranged on a plurality of pages of a memory including the plurality of pages on each of which data can be arranged,
the memory including a plurality of tiles each including one or more pages,
each of the plurality of tiles being configured to be capable of transitioning among a plurality of states in which power consumption suppression rates are different,
the method comprising
rearranging the data such that a tile in which high access frequency data are collected and a tile in which low access frequency data are collected are present.

REFERENCE SIGNS LIST

1 BUS MASTER
2 MEMORY
21 PAGE
22 TILE
3 PMU
4 DEFRAGMENTING DEVICE
41 DMAC
42 MANAGEMENT TABLE
43 SEQUENCER

The invention claimed is:

1. A memory system comprising:
a memory including a plurality of pages on each of which data can be arranged;
a defragmenting device that rearranges the data arranged on the plurality of pages, wherein
the memory includes a plurality of tiles each including one or more pages,
each of the plurality of tiles is configured to be capable of transitioning among a plurality of states in which power consumption suppression rates are different,
the plurality of states include a low power consumption state different from a power-off state, and
the defragmenting device rearranges the data such that a tile in which high access frequency data are collected and a tile in which low access frequency data are collected are present, and the defragmenting device rearranges the data based on a comparison result of an access frequency maximum value of one tile among tiles adjacent to each other in a number management and an access frequency minimum value of an other tile.

2. The memory system according to claim 1, wherein the defragmenting device transitions a state of each of the plurality of tiles such that a tile having a lower data access frequency transitions to a state in which the power consumption suppression rate is larger.

3. The memory system according to claim 1, wherein the defragmenting device transitions a state of each of the plurality of tiles such that a tile having a longer period without data access transitions to a state in which the power consumption suppression rate is larger.

4. The memory system according to claim 2, wherein
the plurality of states includes the power-off state, and
the defragmenting device transitions a state of a tile of a nonvolatile memory to the power-off state.

5. The memory system according to claim 1, wherein
the plurality of states includes the power-off state, and
when the data is rearranged such that there is a tile including only an unused page on which data is not arranged, the defragmenting device transitions a state of the tile to the power-off state.

6. The memory system according to claim 1, wherein
when an access frequency of highest access frequency data in the tile is set as an access frequency maximum value of the tile and an access frequency of lowest access frequency data is set as an access frequency minimum value of the tile,
the defragmenting device rearranges the data such that the access frequency maximum value of the one tile among tiles adjacent to each other in number management, the access frequency minimum value of the one tile, the access frequency maximum value of the other tile, and the access frequency minimum value of the other tile are lowered in this order.

7. The memory system according to claim 1, wherein the defragmenting device transfers the data between the one tile and the other tile such that the access frequency minimum value of the one tile does not fall below the access frequency maximum value of the other tile.

8. The memory system according to claim 1, wherein the defragmenting device rearranges the data based on a ranking result of access frequencies of the data.

9. The memory system according to claim 8, wherein
the defragmenting device rearranges the data when a difference value between the access frequency maximum value and the access frequency minimum value of at least one tile is larger than a threshold.

10. A method comprising:
for a memory including a plurality of pages on each of which data can be arranged, rearranging the data arranged on the plurality of pages, wherein the memory includes a plurality of tiles each including one or more pages, each of the plurality of tiles is configured to be capable of transitioning among a plurality of states in which power consumption suppression rates are different, and the plurality of states include a low power consumption state different from a power-off state;

rearranging the data such that a tile in which high access frequency data are collected and a tile in which low access frequency data are collected are present; and rearranging the data based on a comparison result of an access frequency maximum value of one tile among tiles adjacent to each other in a number management and an access frequency minimum value of an other tile.

11. A non-transitory computer readable medium storing a program, the program being executable by at least one processor to perform operations comprising:

for a memory including a plurality of pages on each of which data can be arranged, rearranging the data arranged on the plurality of pages, wherein the memory includes a plurality of tiles each including one or more pages, each of the plurality of tiles is configured to be capable of transitioning among a plurality of states in which power consumption suppression rates are different, and the plurality of states include a low power consumption state different from a power-off state;

rearranging the data such that a tile in which high access frequency data are collected and a tile in which low access frequency data are collected are present; and rearranging the data based on a comparison result of an access frequency maximum value of one tile among tiles adjacent to each other in a number management and an access frequency minimum value of an other tile.

12. The non-transitory computer readable medium according to claim 11, wherein the operations further comprise:

transitioning a state of each of the plurality of tiles such that a tile having a lower data access frequency transitions to a state in which the power consumption suppression rate is larger.

13. The non-transitory computer readable medium according to claim 11, wherein the operations further comprise:

transitioning a state of each of the plurality of tiles such that a tile having a longer period without data access transitions to a state in which the power consumption suppression rate is larger.

14. The non-transitory computer readable medium according to claim 12, wherein the plurality of states includes the power-off state, and the operations further comprise transitioning a state of a tile of a nonvolatile memory to the power-off state.

15. The non-transitory computer readable medium according to claim 11, wherein the plurality of states includes the power-off state, and when the data is rearranged such that there is a tile including only an unused page on which data is not arranged, the operations further comprise transitioning a state of the tile to the power-off state.

16. The non-transitory computer readable medium according to claim 11, wherein the operations further comprise:

when an access frequency of highest access frequency data in the tile is set as an access frequency maximum value of the tile and an access frequency of lowest access frequency data is set as an access frequency minimum value of the tile, rearranging the data such that the access frequency maximum value of the one tile among tiles adjacent to each other in number management, the access frequency minimum value of the one tile, the access frequency maximum value of the other tile, and the access frequency minimum value of the other tile are lowered in this order.

17. The non-transitory computer readable medium according to claim 11, wherein the operations further comprise:

transferring the data between the one tile and the other tile such that the access frequency minimum value of the one tile does not fall below the access frequency maximum value of the other tile.

18. The non-transitory computer readable medium according to claim 11, wherein the operations further comprise:

rearranging the data based on a ranking result of access frequencies of the data.

* * * * *